United States Patent [19]

Ciupke et al.

[11] 4,198,134
[45] Apr. 15, 1980

[54] FILM CARTRIDGE

[75] Inventors: Werner W. Ciupke, Burlingame; Steven R. Runyan; Hugh P. Sherlock, both of Palo Alto, all of Calif.

[73] Assignee: Montron Corporation, Mountain View, Calif.

[21] Appl. No.: 789,002

[22] Filed: Apr. 19, 1977

Related U.S. Application Data

[63] Continuation of Ser. No. 535,376, Dec. 23, 1974, abandoned.

[51] Int. Cl.$^2$ .............................................. G03B 21/00
[52] U.S. Cl. .................................. 352/129; 352/78 R; 352/128; 352/228; 242/55.19 A; 242/55.21
[58] Field of Search ...................... 352/129, 78 R, 128, 352/228; 242/55.17, 55.19 R, 55.19 A, 55.21

[56] References Cited

U.S. PATENT DOCUMENTS

| | | | |
|---|---|---|---|
| 2,338,421 | 1/1944 | Fries | 242/55.19 R |
| 3,273,953 | 9/1966 | Davee | 352/228 |
| 3,301,128 | 1/1967 | Brandt | 352/228 |
| 3,479,112 | 11/1969 | Lester | 352/78 R |
| 3,561,851 | 2/1971 | Martin | 352/78 R |
| 3,706,439 | 12/1972 | Skinner | 352/129 |

FOREIGN PATENT DOCUMENTS 496974  12/1938  United Kingdom ...................... 352/128

OTHER PUBLICATIONS

Journal of the Patent Office Society, vol. 60, No. 1, Jan., 1978, pp. 3–13.

*Primary Examiner*—Monroe H. Hayes
*Attorney, Agent, or Firm*—Harold C. Hohbach

[57] ABSTRACT

Film cartridge for use in viewing motion picture film having means forming a framework with an index plate with an aperture therein. A continuous length of film having perforations along one edge thereof is carried by the framework. Guide means is provided on the framework for guiding the film over the index plate and past the aperture. Means is provided for advancing the film frame by frame past the aperture. A spool is rotatably mounted on the framework. The spool has a central hub and a film supporting surface extending radially from the hub so that the hub extends away from the surface in a direction generally perpendicular to the surface. The spool has an annular rim spaced from the hub and extending away from the surface and in the same direction as the hub. A portion of the length of film is formed as a roll and is disposed in the spool with the hub in the center of the roll and with the rim on the outside of the roll so that the film can be payed out continuously either from the inside of the roll or the outside of the roll during movement past the aperture.

20 Claims, 9 Drawing Figures

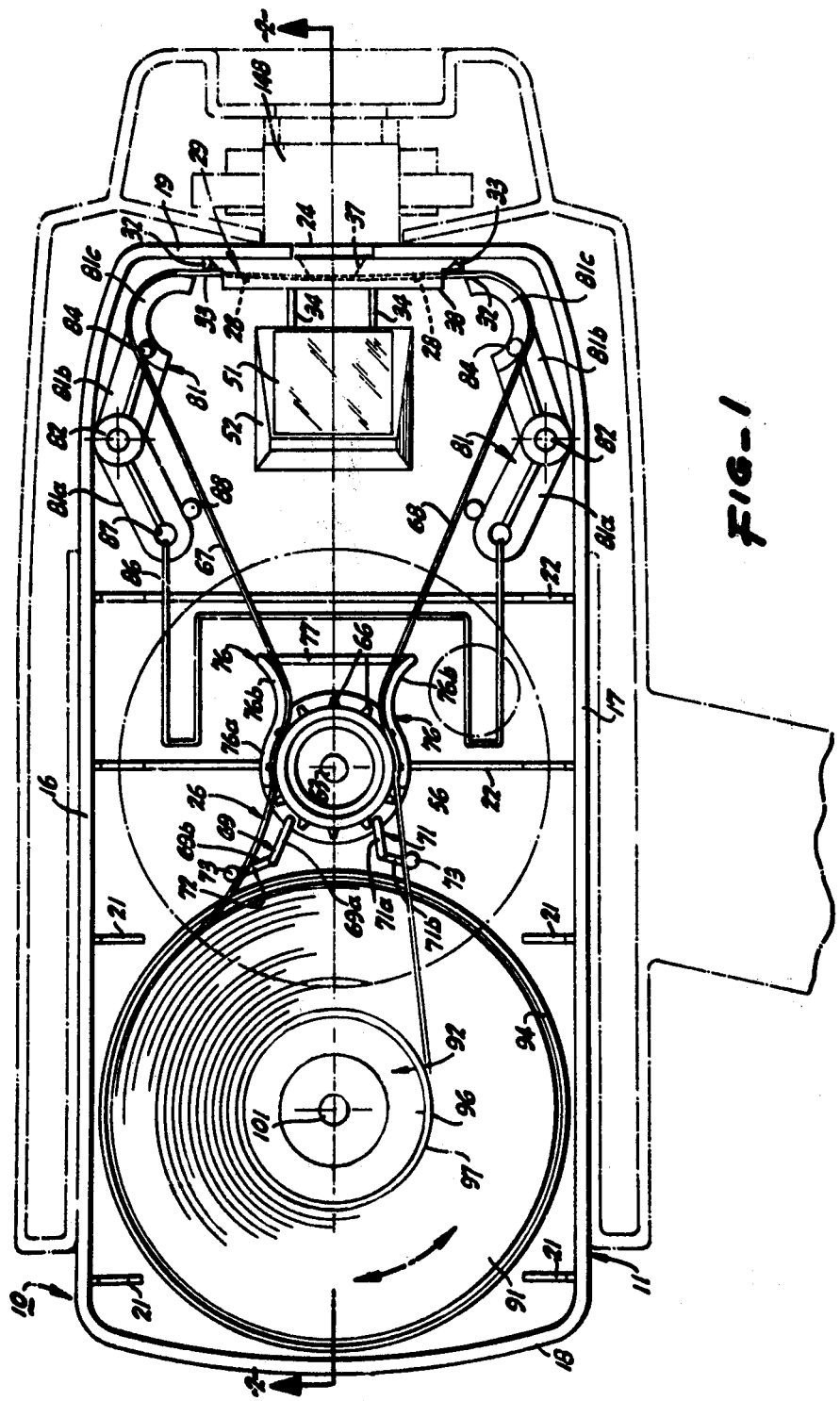

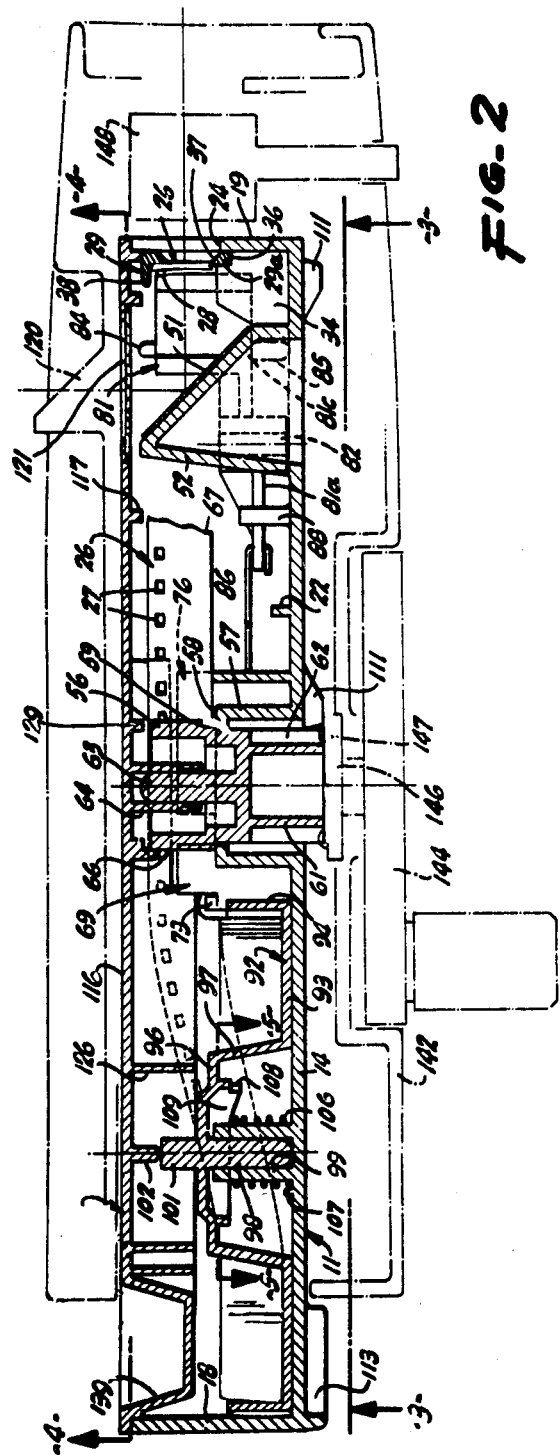
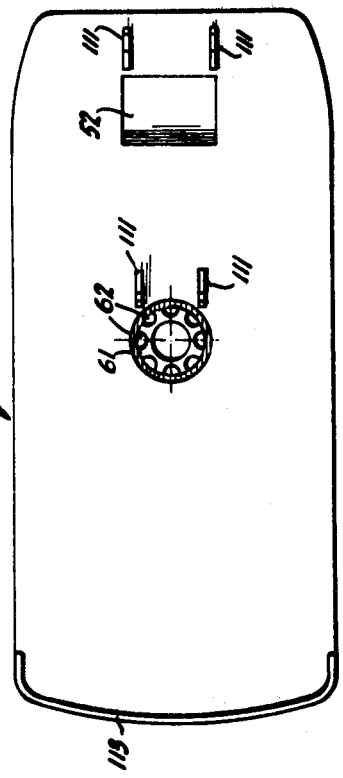

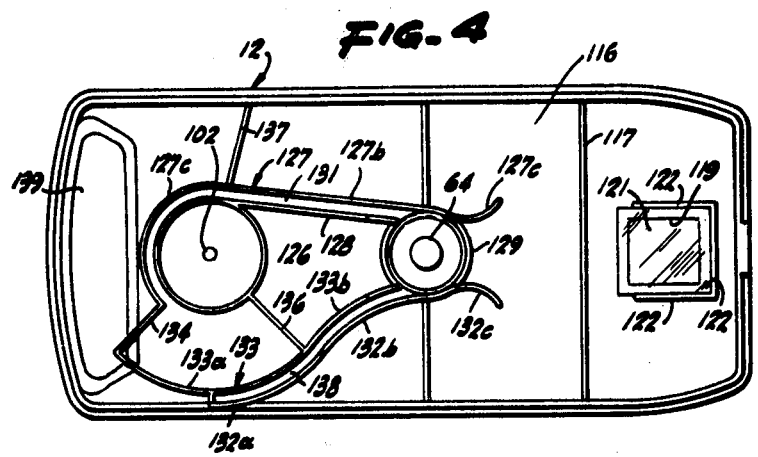

FILM CARTRIDGE

This is a continuation of application Ser. No. 535,376, filed Dec. 23, 1974, now abandoned.

BACKGROUND OF THE INVENTION

In U.S. Pat. Nos. 3,706,439 and 3,817,610, there are disclosed film magazines which have been utilized for viewing motion picture film. It has been found in the manufacture of magazines of the type disclosed in those patents that certain difficulties have been encountered. By way of example, it has been found that the cartridges have a relatively large number of parts and that the assembly of the cartridge is relatively complex because it must be assembled from both sides. Other disadvantages are that the cartridge carries too little film and the cartridge is too noisy when operated. There is, therefore, a need for a new and improved film cartridge.

SUMMARY OF THE INVENTION AND OBJECTS

The film cartridge consists of a framework having an aperture therein. A continuous length of film having perforations along one edge thereof is provided in the framework. Guide means is provided for guiding the film past the aperture. Means is provided in the framework for advancing the film frame by frame past the aperture. A spool is rotatably mounted on the framework and has a central hub and a film supporting surface extending radially therefrom in such a manner so that the hub extends away from the surface in a direction generally perpendicular to the surface. The spool also has an annular rim extending away from the surface in the same direction as the hub. A portion of the length of film is formed as a roll and is disposed in said spool with the hub in the center of the roll and with the rim on the outside of the roll so that the film can be payed out continuously either from the inside of the roll or the outside of the roll as it is advanced past the aperture.

In general, it is an object of the present invention to provide a film cartridge which can accomodate a greater length of film.

Another object of the invention is to provide a cartridge of the above character which can be assembled exclusively from one side.

Another object of the invention is to provide a film cartridge of the above character which has fewer parts.

Another object of the invention is to provide a film cartridge of the above character which requires the use of a smaller amount of material.

Another object of the invention is to provide a film cartridge of the above character which utilizes a high temperature window.

Another object of the invention is to provide a film cartridge of the above character which reduces the wear on the film in the cartridge.

Another object of the invention is to provide a film cartridge of the above character in which the film will not pop into and out of focus during movement from one frame to another.

Another object of the invention is to provide a film cartridge of the above character in which the index tits have improved wear characteristics.

Another object of the invention is to provide a film cartridge of the above character which will not scratch the film in the cartridge.

Another object of the invention is to provide a film cartridge of the above character in which the film is not shadowed during the time it is being viewed in the aperture.

Another object of the invention is to provide a film cartridge of the above character in which large radius surfaces are used to guide the film to minimize sets in the film.

Another object of the invention is to provide a film cartridge of the above character in which a portion of the length of film in the cartridge is formed in a roll and in which the roll is carried by a rotatable spool open on one side.

Another object of the invention is to provide a film cartridge of the above character which is driven by a sprocket and in which the spacing between the sprocket and the spool has been reduced.

Another object of the invention is to provide a film cartridge of the above character which can be readily inserted and removed from the viewer.

Additional objects and features of the invention will appear from the following description in which the preferred embodiments are set forth in detail in conjunction with the accompanying drawings.

BRIEF DESCRIPTION OF THE DRAWINGS

FIG. 1 is a side elevational view of a film cartridge incorporating the present invention with the top or side cover removed and also showing the film cartridge being used in a viewer which is shown in broken lines.

FIG. 2 is a cross-sectional view taken along the line 2—2 of FIG. 1.

FIG. 3 is a side elevational view taken along the line 3—3 of FIG. 2.

FIG. 4 is a cross-sectional view taken along the line 4—4 of FIG. 2.

FIG. 5 is a cross-sectional view taken along the line 5—5 of FIG. 2.

FIG. 6 is an enlarged detail view of a portion of the film cartridge shown in FIG. 1 showing the manner in which the film is advanced past the aperture.

FIG. 7 is a cross-sectional view taken along the line 7—7 of FIG. 6.

FIG. 8 is a partial cross-sectional view of another embodiment of the film cartridge incorporating the present invention.

FIG. 9 is a cross-sectional view taken along the line 9—9 of FIG. 8.

DESCRIPTION OF PREFERRED EMBODIMENTS

The film cartridge 10 consists of a cartridge body 11 and a cover 12. The film cartridge 10 is formed of a suitable plastic such as styrene. The cartridge body 11 is of a one-piece construction and can be formed in a suitable manner such as by injection molding. It is provided with a planar side wall 14. It is also provided with a planar top and bottom walls 16 and 17, an arcuate rear wall 18 and a generally planar front wall 19, all of which are formed integral with the side wall 14 and extend outwardly from the side wall so that they are generally perpendicular to the side wall.

The cartridge body 11 is formed with reinforcing gussets 21 and reinforcing ribs 22 which extend transversely of side wall 14. The front plate is provided with an aperture 24. The cartridge body 11 is adapted to have a length of motion picture film 26 disposed therein.

In the embodiment of the cartridge shown, the length of film 26 takes the form of a continuous loop. However, it should be appreciated that many of the principles of the present invention can be utilized in conjunction with a non-continuous loop with the use of separate supply and take-up reels. The length of film 26 is of a conventional type having a plurality of spaced frames and is provided with a plurality of perforations 27 extending longitudinally of the length of film along one edge of the length of film.

The perforations 27 are adapted to be engaged by a pair of spaced apart index tits or projections 28 which are disposed on opposite sides of the aperture 24 along the path of travel of the film 26. The tits or projections 28 are carried by an index plate 29 which is formed separate from the cartridge body 11 but, if desired, can be formed integral therewith. When formed separately as in the present embodiment, dovetail means is provided for retaining the index plate 29 in the desired location and consists of a pair of spaced apart members 31 formed integral with the front wall and which form grooves 32 between the front wall and the members 31 that are adapted to receive the inclined edges 33 of the index plate so that the index plate can be slid inwardly into the cartridge body 11 and into the grooves 32. A pair of rearwardly extending ribs 34 have recesses 36 therein which are adapted to receive an extension portion 29a of the index plate so as to firmly grip an intermediate portion of the index plate to hold it in the desired position.

The index plate is provided with a chamfered aperture 37 which is in registration with the aperture 24 in the front wall 19. The aperture 37 in the index plate has been chamfered so as to prevent shadowing of the film frame within the aperture. The index plate 29 is provided with a perpendicularly extending flange 38 which serves as a guide for one side of the film, whereas the other side of the film is guided by an upper surfaces of the ribs 34 adjacent the other side of the index plate 29. It will be noted in FIG. 6 that the index plate has a gradually increasing thickness towards the aperture 37 so as to in effect bow out the film as it passes over the aperture. The index plate is provided with a pair of spaced parallel ribs 39 and 41 on opposite sides of the aperture 37 with the rib 39 being adjacent the flange 38 and the other rib 41 being adjacent the other edge of the index plate. The ribs 39 and 41 are positioned in such a manner that they are adapted to engage the edges of the film and to carry the film over the index plates so that the central portion of the film which carries the information will not be scratched by the undercut surfaces 42 between the ribs 39 and 41. As will be noted from FIG. 7, the ribs 39 and 41 terminate short of the aperture 37 so that the film can come into precise contact with the portion of the index plate immediately adjacent the aperture so that the frame being viewed will always be in a precise position. The tits or projections 28 extend upwardly out of the ribs 39. These tits 28, which are shown more particularly in FIG. 6, have surfaces 44 which are generally perpendicular to the front wall 19 and which are called the front surfaces. The tits or projections 28 are also provided with back surfaces 46 which are rounded or curved in a direction which commences generally perpendicular to the front wall 19 and then curves through approximately 90° to join the perpendicular wall 44. It has been found that this configuration of the tit improves the wear characteristics of the tits or projections.

It will be noted that the surfaces 42 are interrupted by recesses 43 which are immediately adjacent the aperture 37. The tits or projections 28 are spaced in such a manner so that there are three frames between each of the projections and the frame which is being viewed in the aperture 37. Thus, between the two tits or projections 28 there are seven frames of the film.

Means is provided within the cartridge for receiving light introduced into the cartridge and for directing it through the film frame in the aperture 37 and consists of a mirror 51 formed of a suitable reflecting material such as chrome plated foil which is bonded to a mirror support 52. The support 52 is formed integral with the cartridge body and provides a surface so that the mirror is inclined at an angle of 45° with respect to the side wall 14 of the cartridge body 11.

Means is provided for advancing the length of film 26 and consists of a single sprocket 56 which is rotatably mounted in a cylindrical boss 57 formed integral with the cartridge body and extending upwardly into the cartridge body from the side wall 14. The cylindrical boss 57 is provided with an upper bearing surface 58 which is engaged by a bearing surface 59 provided on the sprocket 56. The sprocket is provided with a driven member 61 which extends beyond the outer surface of the side wall 14. This driven member is provided with a plurality of drive pin slots 62 which are spaced circumferentially of the driven member 61. The sprocket 56 is provided with a central bearing post 63 which is adapted to seat within an open-ended cylinder 64 that serves as a bearing carried by the cover 12. Thus, it can be seen that the sprocket 56 is retained in precise registration within the cartridge body 11. The sprocket 56 is provided with a plurality of teeth 66 spaced circumferentially of the sprocket adjacent the cover 12. The length of film 26 is provided with upper and lower runs which are both engaged by the teeth 66 of the sprocket 56. Means is provided for guiding the upper and lower runs 67 and 68 into and out of engagement with the sprocket 56 and consists of a pair of ribs 69 and 71 formed integral with the cartridge body 11. The ribs 69 and 71 are provided with portions 69a and 71a which extend rearwardly at a slight angle towards the top wall and bottom wall 16 and 17 and portions 69b and 71b which extend at a greater angle generally towards the top and bottom walls. The ribs 69 and 71 are provided with slots 72 which are adapted to receive the upper and lower runs of film as shown and support the film in the proper position so that the perforations therein can be engaged by the sprocket 56. Pins 73 are formed integral with the ribs 69 and 71 and extend to a height so that they are engaged by the cover 12 and support the cover 12 so that the cover 12 cannot squeeze the film between the cover and the slots 72.

Additional film guiding means is provided forward of the ribs 69 and 71 and consists of ribs or guide members 76 which are formed integral with the cartridge body 11 and are provided with a curved portion 76a which has generally the same curvature as the sprocket 56 and lies in close proximity to the sprocket as shown in FIG. 1. The guide members 76 are also provided with curved portions 76b which are curved outwardly away from the sprocket 56 and have a curvature which is opposite of the curvature of the portion 76a. A reinforcing rib 77 is provided between the forward extremities of the guide members 76 and serves as a guide to properly position the film between the cartridge body 11 and the cover 12. The ribs 76 engage the cover and serve to prevent the film from being squeezed between the cover and the rib 77. The bottom portions of the ribs 69 and 71 having the slots 72 therein are provided with ribs (not shown) adjacent the lower extremities thereof. The guide members 76 are similarly provided with such ribs (not shown) adjacent the lower extremities of the same so that only the lower margin of the film is engaged by the guide members so as to prevent scratching of the information carried in the frames between the edges of the film. In the film's travel past the sprocket 56, one edge of the film is guided by the bearing surface 58 of the cylindrical boss 57 whereas the other edge of the film is engaged and guided by the cover 12.

As the film is advanced in the cartridge, means is provided in the cartridge for causing the film to be advanced frame by frame in a stepwise motion across the aperture 37. Such means consists of a pair of pivot arms 81 disposed within the cartridge body 11. The pivot arms 81 are pivotally mounted upon pins 82 formed integral with the cartridge body. The pivot arms 81 include first and second arm portions 81a and 81b and an arcuate portion 81c. The arcuate portion is provided with a pair of spaced parallel ribs 83 on the outer surface of the arcuate portion which are adapted to be engaged by the edges of the film so as to prevent scratching or marring of the central or frame portion of the film 26. It will be noted that the pivot arms 81 are positioned in such a manner so that the arcuate portions 81c are in relatively close proximity to the forwardmost extremity of the cartridge body 11 and are disposed outside of the tits or projections 23 as can be seen in FIG. 6. The arcuate portions 81c carry pins 84 and 85 formed integral therewith. The pins 85 serve to prevent canting of the pivot arms and binding of the same on the posts or pins 82. The pins 84 serve to maintain the proper spacing between the cover plate and film so that the cover will not bind the film between the cover 12 and the pivot arm portions 81c.

Yieldable means is provided for urging the arcuate portions 81c in directions away from the tits or projections 28 and consists of a spring 86 which has opposite ends of the same engaging holes 87 provided in the pivot arms 81. The spring 86, as can be seen, is of the leaf-spring type and is a generally U-shaped configuration as shown and applies forces tending to bring the portions 81a towards each other for a predetermined distance as determined by stop ins 88 formed integral with the side wall 14.

The length of film 26 which is provided within the film cartridge 10 has a suitable length such as 35 feet. A substantial portion of this length of film is formed into a roll 91 which is disposed in a pool 92. The spool 92 is generally in the form of a disc-shaped member and is provided with a circular planar side wall 93. It also is provided with an upstanding rim or flange 94 which extends substantially at right angles thereto and has a height which is approximately one-half the height of the walls 16, 17, 18 and 19 of the cartridge body 11. The spool 92 is provided with an inner hub which is relatively large in diameter and is formed with a truncated cone-like surface 97 which is inclined upwardly and inwardly that is adapted to be engaged by the inner surface of the roll 91 of the film. Because of the inclination of the surface 97, only the lower extremity of the film will engage the surface. As hereinafter described, this will tend to cause the film to ride upwardly out of the spool during pay out of film from the spool. A centrally disposed fixed pin 98 is formed in the spool and extends downwardly through the hub and is adapted to seat in a cylindrical recess or well 99 formed in the cartridge body 11. As can be seen in FIG. 2, the extremity of the pin 98 is radiused or rounded to facilitate rotation of the spool. Another pin 101 is provided on the top part of the hub and is in registration or alignment with a pin 102 carried by the cover 12. It will be noted that even though the pin 102 can touch the pin or spindle 101, it does not interfere with rotation of the spool 92 because of the rounded end provided on the pin 102.

Means is provided for permitting the spool 92 to spin freely in one direction but to prevent it from going in a reverse direction. This means takes the form of a ratchet and consists of a helical spring 106 which is mounted on the means forming the cylindrical recess or well 99 and has one end engaging a protrusion or rib 107 provided on the inner surface on the side wall 14 and having another end engaging a notch 108 formed on a circular downwardly inclined ramp 109 formed on the inner surface of the hub 96 (see FIGS. 2 and 5).

The outer surface of the side wall 14 is provided with two pairs of spaced ribs 111, one pair being adjacent the forward extremity of the film cartridge and the other pair being adjacent the driven member 61 of the sprocket 56. The ribs 111 have a height so that their upper surface is generally flush with the outer extremity of the driven member 61.

The rear wall 18 is provided with an arcuate extension or lip 113 which serves two functions; one, it prevents insertion of the film cartridge into a viewer in the wrong direction, and secondly, it facilitates removal of the film cartridge from the viewer.

The cover 12 is generally planar as shown and forms the other side wall for the film cartridge 10. It consists of a planar side or member 116 which has reinforcing ribs 117 extending transversely thereof. As hereinbefore pointed out, the cylindrical member 64 is formed integral with the wall 116 as in pin 102.

Means is provided in the cover 12 for admitting light into the film cartridge 10 so that is can impinge upon the mirror 51 and consists of a square opening 119. A window 121 of a suitable transparent material such as a high temperature plastic is mounted over the opening 119 and is retained therein by suitable means such as retaining ribs 122 formed integral with the side wall 116. As can be seen, the window 121 can be slipped into and out of engagement with the ribs 122.

The cover 12 is provided with film guiding means which cooperates with the film guiding means carried by the cartridge body. Thus, there is provided a cylinder 126 formed integral with the wall 116. The cylinder 126 overlies the spool 92 and has generally the same size as the hub 96 of the spool. A J-shaped guide member 127 is formed integral with the cover 12. It has a curved portion 127a that lies adjacent the cylinder 126. A straight portion 127b extends from the cylinder 126 to a region near the cylinder 64. It is also provided with an outwardly curved portion 127c which extends toward the forward end of the cartridge 10. There is also provided another guide member 128 which is parallel to the portion 127b of the guide member 127 and extends from the cylinder 126 to the region adjacent another cylinder 129 which is generally the same size as the sprocket 56. The members 126 and 127 form a passageway or guideway 131 for the upper run of the length of film. A curved guide member 132 is provided which extends from the bottom wall to the cylinder 129 and forwardly thereof and consists of curved portions 132a which has generally the same curvature as the cylinder 126, another curved portion 132b which is curved towards the cylinder 129 and a further curved portion 132c which is curved outwardly toward the bottom wall. Another guide member 133 is provided which extends from the rear of the plate 116 with a curved portion 133a and another curved portion 133b which extends to the cylinder 129. Reinforcing ribs 134, 136 and 137 are provided. The members 132 and 133 form a guideway 138 for the lower run 68 of the length of film.

The rear end of the cover 12 is provided with a recess extending transversely of the rear extremity thereof which can serve as a finger grip to facilitate pulling the cartridge 10 from the viewer.

The film cartridge 10 is shown in the drawings as being used with a viewer 141 which is shown in broken lines. The viewer 141 is a conventional type and is described in U.S. Pat. No. 3,819,257. As described therein, it consists of a housing 142 which is provided with a cavity or recess for receiving the cartridge. A crank 144 is mounted on the housing and is used for driving a drive member which carries pins or protrusions 147 which are adapted to engage the slots 62 provided in the driven member 61. An optical assembly 148 having a focussing knob 149 is provided in the viewer housing for viewing the image which is formed in the aperture 24 in the cartridge body.

Assembly of the film cartridge is accomplished by taking the cartridge body 11 having its open side up and first cementing in the chrome plated mirror 51 upon the support 52. The index plate 29 is then pushed into place until it is firmly seated in the dovetailed slots which receive the ends of the index plate. The pivot arms 81 are dropped over the pivot pins 82 and spring 86 is inserted. The ends of the spring 86 are engaged in the holes 87 of the pivot arms. The sprocket 56 is then dropped into the cylindrical boss 57 and, if desired, the driven member 61 carried thereby can be engaged by a retaining jig (not shown) on the bottom side of the cartridge body 11 to hold it in place until after the cover 12 is secured to the cartridge body 11.

The coil spring 106 is dropped over the means forming the cylindrical recess or well 99 and then the spool 92 is positioned so that the pin 98 seats within the well 99. The roll of film 91 is then placed in the spool in such a manner so that the hub 96 extends through the center of the roll as shown in FIG. 1. The portion of the endless loop which feeds off the outer part of the roll is used to form the upper run 67 and the portion on of the endless loop which feeds from the inside of the roll 91 is used for the lower run 68. The upper and lower runs 67 and 68 are dropped into the slots 72 provided in the ribs 69 and 71. The upper run is then taken and threaded onto the sprocket 56 by placing the same between the guide member 56 and into engagement with the teeth 66 of the sprocket. The upper run is then placed over the arcuate portion 81c of the upper pivot arm 81. It is then placed behind the index plate 79 so that it is behind the flange 38 and has the perforations in the film in engagement with the tits or projections 28 provided on the index plate. The film is then looped over the arcuate portion 81c of the lower pivot arm 81 and fitted between the guide member 76 and in engagement with the teeth 66 of the sprocket and then is dropped into the slot 72 of the rib 71. This completes the assembly of the parts in the cartridge body. The reafter, the window 121 is inserted into the dovetailed slots formed by the ribs 122 in the cover 12. The cover 12 can then be positioned over the top of the cartridge body 11 so that the upper and lower runs of the film fit into the guideways 131 and 138 provided in the cover 12. The cover 12 is bonded to the cartridge body 11 in a suitable mannner such as by ultrasonic welding. Alternatively, if desired, a plastic cement can be utilized.

From the foregoing operations it can be seen that assembly of the cartridge can be performed by inserting the parts into the cartridge body 11 from one side of the cartridge body and that it is unnecessary to turn the cartridge body 11 upside down. This is particularly advantageous when the film cartridge is assembled on an automated or semi-automated assembly line.

Operation and use of the film cartridge may now be briefly described. Let it be assumed that the film cartridge has been inserted in a suitable viewer such as viewer 141 shown in the drawing and that the viewer is provided with means such as drive member 146 which engages the driven member 61 which can be driven in counter-clockwise and clockwise directions. By way of example, let it be assumed that the sprocket 56 is being driven in a counter-clockwise direction as viewed in FIG. 1. As this is occurring, the upper run 67 of the film 26 will be pulled onto the outer circumference of the roll 91 and the arcuate portion 81c of the pivot arm 81 will be pulled downwardly and inwardly against the force of the spring 86 in the manner shown in broken lines in FIG. 6 until the perforation 27 of the film 26 is moved clear of the tit or projection 28 at which time the film will be rapidly advanced past the aperture 37 in the index plate 29 until the next perforation 27 comes into engagement with the tit or projection 28 to stop the advance of the film. At that time that the film is being advanced, a spring force is applied to the upper pivot arm 81 and the arcuate portion 81c is rapidly moved upwardly into its final position so that the next perforation 27 in the film will surely engage the tit or projection 28. The film frame which is in the aperture 37 remains in this position until the arcuate portion 81c is again brought down into the broken line position shown in FIG. 6 and another film frame is advanced. Thus, it can be seen that sequential frames of the film are rapidly intermittently advanced into the viewing aperture 37 to provide motion picture images which can be viewed by an eye placed next to the viewer and viewing the image through the optical assembly 148. During the time this is occurring, the film is being fed or payed out from the inside of the roll and is being returned or payed in to the outside of the roll.

When the sprocket 56 is rotated in the opposite or clockwise direction as viewed in FIG. 1, the lower pivot arm 81 will be moved so that its arcuate portion 81c moves inwardly and upwardly so as to cause the film perforation 27 to clear the lower tit or projection 28 to cause rapid advance of the film frame by frame past the aperture 37. When this is occurring, the film is returned or payed in to the inside of the roll and is removed or payed out from the outside of the roll 91. Thus, it can be seen that the endless loop of film 26 can be operated in either forward or reverse directions and can be viewed in both directions in the viewing aperture 37.

It can be seen from the illustrations in FIGS. 1 and 6 that even when the film is being moved off of one of the projections 28, the film frame remains in the same position on the index plate 29 so that it always remains in focus. In other words, the film frame does not jump into and out of focus as the film frame is being moved into and out of the viewing aperture 37. It always lies in the same focal plane. As described previously, this has been accomplished by providing the ramp-like surfaces on the ribs 39 and 41 which are inclined upwardly toward the viewing aperture in such a manner so that even when the angle of the film changes as shown in broken lines in FIG. 6, the portion of the film in the aperture is not lifted away from the aperture 37 at the time the film clears one of the tits or projections 28.

It can be seen that the means provided for guiding the film from the roll 91 to the pivot arms 81 has been simplified. The film guiding means is particularly efficacious because it permits ready and easy insertion of the roll into the spool 92 and insertion over the sprocket 56 and over the pivot arms 81 and into registration with the index plate 29. When this has been accomplished in the cartridge body 11, the cover 12 can be dropped into place and secured thereto as hereinbefore described to hold the index plate 29, the sprocket 56 and the spool 92 in place as well as the length of film 26. With the construction hereinbefore provided, the film is always retained in the proper position within the film cartridge. The film cartridge has been provided with means to maintain the proper dimensions in the paths in which the film travels so that it cannot be squeezed in the film guides.

In the foregoing description it should be appreciated that all of the film guiding surfaces which engage the film have been provided with ribs so that only the outer margins of the film are engaged by the guides so that there will be no scratching or wearing engagement of the portions, i.e. the frames, of the film between the edges which carry the image information. As will be recalled, the index plate 29 is provided with ribs as are the arcuate portions 81c and the guides 76. The spool 92 has been provided with the upwardly extending rim 94 so that the outer surface of the roll 91 will not rub against the walls of the cartridge body 11. This rim 94 has an additional advantage in that when the film is being fed into the roll on the outside, the engagement of the film with the rim helps to drive the spool and makes it possible to place a greater length within the roll. When in the roll, only the edge of the film is engaging the bottom wall of the spool 92. Even in the center of the roll, only the lower margin of the film is engaged by the hub 96 because the hub 96 is provided with an inclined surface 97. The tapered surface also has the advantage in that the lower edge of the film tends to ride upwardly on the hub to help push the film up from the center of the roll and towards the sprocket 56.

As hereinbefore described, the spool 92 is provided with a clutching mechanism in the form of the spring 106 so that the spool can spin freely when the film is being moved in a forward direction, i.e. the spool is being moved in a counter-clockwise direction. This is because the film is being payed off from the center of the roll 91 and the forces are quite small. This also serves to prevent the outer loops on the roll from opening up which, in turn, could cause the inner loops of the roll to tighten around the spool and eventually cause possible jamming of the film in the cartridge. When the film is being advanced in the opposite direction, i.e. when it is being payed off of the outside of the roll, the spool 92 is prevented from rotating any substantial distance because of action of the spring 106. Since the film is being payed off from the outside of the roll, the roll remains tight. The film is fed into the center of the roll.

By providing this clutching action to prevent clockwise rotation of the spool, it is possible to load the spool with a greater length of film than would otherwise be possible.

The film cartridge of the present invention has numerous advantages over the previous cartridges. For example, it now has a removable window 121 which permits the same to be formed of high temperature plastic so that the cartridge can be utilized with high power light sources.

The cartridge is formed in such a manner so as to have an attractive appearance because of the rounded corners. It is also formed in such a manner so that it cannot be inserted into the viewer in the wrong direction. The lip 113 serves this function. In addition, the lip 113 in conjunction with the recess 132 provides means to permit the hand to readily grip the cartridge so that it can be readily removed and inserted from the viewer.

From the arrangement shown, it can be seen that the sprocket 56 is in relatively close proximity to the spool 92 so that the film guiding paths between the sprocket and the spool are relatively short with very few bends. It also will be noted that the bends which are provided in the film are on large radiuses which serves to prevent permanent deformation from the setting in the film and also helps to prevent jamming of the cartridge.

When the film is being fed from the outside of the roll 92, and the spool 92 is stopped, this places greater friction on the edge of the film and serves to pull and keep the roll 91 relatively tight so that it will not expand and start binding in the guideway 138 provided in the cover 12.

From the foregoing, it can be seen that the film cartridge has numerous advantages. The distance between the sprocket and the spool has been shortened to provide shorter lengths of film between the same so that the film can be pushed into the roll 91 in both directions. The guide channels for the film are relatively straight so as to prevent kinking of the film in the channel when the film is being moved into the spool. The film is guided down into the lip or rim of the spool rather than pushing it against the wall of the cartridge. The cartridge also is one which can be readily injection molded. It also has relatively few parts.

Another embodiment of the film cartridge is shown in FIGS. 8 and 9 is which a single member 151 formed of a suitable plastic such as acetal is substituted for the pivot arms 81 and the spring 106. The member 151 is provided with a base 152 which is mounted between a pair of upstanding pins 153 and a single upstanding pin 154 provided on the wall 14 spaced from the pins 153. The base 152 is provided with projections 156 which are disposed on opposite sides of the pin 154. Thus, it can be seen that the base 152 is firmly retained between the pins 153 and 154. The member 151 also includes spring-like arms 157 which are formed integral with the case that extend outwardly and forwardly from the base. The arms 157 are provided with curved surfaces 158 which are adapted to engage the upper and lower runs of the film in the same manner as the pivot arms 81 as shown in FIG. 8. Since the arms 157 are formed of plastic, they apply a yieldable force urging the film into engagement with the index plate 29 and into engagement with the registration pins or tits 28. As the film is advanced, one of the arms will be flexed inwardly to cause the film to be released from one of the tits or perforations 28 in the same manner as hereinbefore described in conjunction with the pivot arms 81. The use of the members 151 in the cartridge is advantageous in that it reduces the noise in the cartridge as the film is advanced frame by frame past the aperture.

We claim:

1. In a cartridge for use in viewing motion pictures, means forming a framework having indexing means mounted thereon, said indexing means having an aperture therein and a pair of spaced apart index projections disposed on opposite sides of the aperture, a continuous length of film having perforations along one edge thereof, guide means for guiding said film over said indexing means and past said aperture, means for advancing the film past the aperture in a plane in forward and reverse directions and a spool rotatably mounted in said framework, said spool having a central hub with a film supporting surface extending radially therefrom so that the hub extends away from the surface in a direction generally perpendicular to said surface, said spool having an annular rim extending outwardly from the surface in the same direction as the hub, a portion of said length of film being formed as a roll and being disposed in said spool with the hub in the center of the roll and with the rim on the outside of the roll so that the film can be payed out continuously either from the inside of the roll or the outside of the roll, said film when being payed in on the outside of the roll and engaging said annular rim to help drive the spool.

2. A cartridge as in claim 1 wherein said hub is in the form of a truncated cone of relatively large diameter having an inclined surface adapted to be engaged by the film, said inclined surface being inclined inwardly toward the axis of the hub in a direction away from the film supporting surface.

3. A film cartridge as in claim 1 together with clutch means for permitting free rotation of the spool in one direction when film is being payed off from the inside of the roll and preventing substantial rotation of the spool in an opposite direction when film is being payed off from the outside of the roll.

4. A film cartridge as in claim 1 wherein said means for driving the film includes a single sprocket disposed in relatively close proximity to the spool, rib means formed in the cartridge between the spool and the sprocket, said rib means having slots therein for receiving upper and lower runs of the film and arcuate guide means engaging the film and retaining the upper and lower runs of the film in engagement with the sprocket.

5. A film cartridge as in claim 4 wherein said guide means are provided with ribs so that only the outer margins of the film are engaged by the guide means.

6. A film cartridge as in claim 1 wherein said means for guiding the film past the aperture includes arms having non-rotatable arcuate surfaces engaging the film and means for yieldably urging the arms having arcuate surfaces in a direction to move the film into engagement with the index means.

7. A film cartridge as in claim 6 wherein said arcuate surfaces are provided with ribs so that only outer margins of the film are engaged by the arcuate surfaces.

8. A film cartridge as in claim 1 wherein said indexing means is provided with inclined surfaces on opposite sides of the aperture so that the film is bowed in its travel over the indexing means so that when the film is moved out of engagement with one of the projections, the portion of the film in the aperture remains in the same plane in the aperture.

9. A film cartridge as in claim 8 wherein said indexing means includes an index plate removably mounted in the framework, said index plate having the aperture therein, said index plate being formed with film guiding surfaces which are inclined upwardly toward the aperture.

10. In a cartridge for use in viewing motion pictures, a cartridge body having a generally planar side wall and upstanding end walls providing an open side, a cover mounted on said cartridge body enclosing said open side, one of said end walls having an opening formed therein, indexing means carried by the cartridge body and having an aperture therein in registration with the opening in the end wall, said indexing means having a pair of spaced apart projections disposed on opposite sides of the aperture, a length of film having perforations along one edge thereof disposed in said cartridge, guide means for guiding said film over said indexing means past said aperture in a plane, sprocket means mounted in the cartridge body for advancing the film past the aperture, and means in the cartridge body for paying out said film and for taking up said film, said indexing means being provided with inclined surfaces on opposite sides of the aperture so that the film is bowed inwardly into the cartridge and away from the opening in the end wall in its travel over the indexing means so that when the film is moved out of engagement with one of the projections, the portion of the film in the aperture remains in the same plane with respect to the aperture.

11. A cartridge as in claim 10 wherein said cartridge body is formed with a boss therein providing a bearing surface and wherein said means for advancing said film includes a sprocket having a shoulder riding upon said bearing surface of the boss, said sprocket carrying a driven member accessible from the exterior of the cartridge.

12. A cartridge as in claim 10 wherein said cartridge body and said cover are provided with means for preventing binding of said film in said cartridge as the film is advanced.

13. A cartridge as in claim 10 wherein all of the parts of said cartridge are constructed so that they can be positioned through the open side of the cartridge before the cover is put in place.

14. A cartridge as in claim 10 wherein said guide means for guiding the film over the indexing means includes arms and means mounting said arms for swinging movement between first and second positions, said arms having non-rotatable arcuate surfaces of a relatively large radius adapted to be engaged by the film.

15. A cartridge as in claim 14 wherein said arcuate surfaces are provided with ribs which are positioned so that only the outer margins of the film are engaged by the arcuate surfaces.

16. A cartridge as in claim 10 wherein said guide means includes guide members carried by the cover and cooperating with the guide means carried by the cartridge body.

17. A cartridge as in claim 10 wherein said length of film is continuous and wherein a portion of said length of film is formed as a roll, said cartridge including a spool rotatably mounted in the cartridge body and receiving said roll, said spool having an outer rim which is adapted to be engaged by the film.

18. A cartridge as in claim 17 wherein said spool is provided with a relatively large center hub having an inclined surface which is inclined upwardly and inwardly adapted to be engaged by the film in the center of the roll.

19. A film cartridge as in claim 18 together with clutch means for preventing substantial rotation of said spool in one direction but permitting substantially free rotation of the spool in an opposite direction.

20. A cartridge as in claim 17 wherein the rim of the spool has a height which is approximately one-half of the space in between the side wall of the cartridge body and the cover and wherein the film is payed into and out of said spool over said rim.

* * * * *